United States Patent
Levenfeld Laredo et al.

(10) Patent No.: US 11,121,366 B2
(45) Date of Patent: Sep. 14, 2021

(54) ELECTRODES FOR RECHARGEABLE LITHIUM BATTERIES

(71) Applicant: UNIVERSIDAD CARLOS III DE MADRID, Leganes (ES)

(72) Inventors: Belen Levenfeld Laredo, Leganes (ES); Maria Eugenia Sotomayor Lozano, Leganes (ES); Wilmer Oswaldo Bucheli Erazo, Leganes (ES); Jean Yves Sanchez, Leganes (ES); Alejandro Varez Alvarez, Leganes (ES); Jose Manuel Amarilla Alvarez, Leganes (ES)

(73) Assignee: UNIVERSIDAD CARLOS III DE MADRID, Leganes (ES)

( * ) Notice: Subject to any disclaimer, the term of this patent is extended or adjusted under 35 U.S.C. 154(b) by 256 days.

(21) Appl. No.: 16/085,371

(22) PCT Filed: Mar. 16, 2017

(86) PCT No.: PCT/ES2017/070149
§ 371 (c)(1),
(2) Date: Feb. 11, 2019

(87) PCT Pub. No.: WO2017/158223
PCT Pub. Date: Sep. 21, 2017

(65) Prior Publication Data
US 2019/0173083 A1    Jun. 6, 2019

(30) Foreign Application Priority Data

Mar. 16, 2016  (ES) ................ ES201630313

(51) Int. Cl.
*H01M 4/485* (2010.01)
*H01M 10/052* (2010.01)
(Continued)

(52) U.S. Cl.
CPC ......... *H01M 4/485* (2013.01); *H01M 4/5825* (2013.01); *H01M 10/052* (2013.01);
(Continued)

(58) Field of Classification Search
CPC ............... H01M 4/485; H01M 10/052; H01M 10/0568; H01M 10/0569; H01M 2/16;
(Continued)

(56) References Cited

U.S. PATENT DOCUMENTS

2007/0254213 A1* 11/2007 Best .................. H01M 10/399
429/210
2008/0020278 A1* 1/2008 Schmidt .............. H01M 4/622
429/221

(Continued)

OTHER PUBLICATIONS

Journal of Power Sources, 2013, p. 496-475 (Year: 2013).*
(Continued)

*Primary Examiner* — Alexander Usyatinsky
(74) *Attorney, Agent, or Firm* — Hayes Soloway PC

(57) ABSTRACT

The present invention relates to an electrode made of a lithium active ceramic material, without polymer binders and with a thickness more than 50 μm, to the method for manufacturing same, and to the use thereof in rechargeable batteries.

8 Claims, 2 Drawing Sheets

(51) Int. Cl.
| | |
|---|---|
| H01M 50/411 | (2021.01) |
| H01M 4/58 | (2010.01) |
| H01M 10/0568 | (2010.01) |
| H01M 10/0569 | (2010.01) |
| H01M 4/02 | (2006.01) |

(52) U.S. Cl.
CPC ... *H01M 10/0568* (2013.01); *H01M 10/0569* (2013.01); *H01M 50/411* (2021.01); *H01M 2004/027* (2013.01); *H01M 2300/0037* (2013.01)

(58) Field of Classification Search
CPC .... H01M 4/58; H01M 4/1391; H01M 4/5825; H01M 4/131; H01M 10/0525; H01M 2/1653; H01M 10/0565; H01M 2004/021; H01M 2300/0085; H01M 2300/0022; H01M 2300/0037; H01M 2004/027
See application file for complete search history.

(56) References Cited

U.S. PATENT DOCUMENTS

| | | | | |
|---|---|---|---|---|
| 2011/0086272 A1* | 4/2011 | Kepler | ........... | H01M 4/505 |
| | | | | 429/220 |
| 2013/0055559 A1* | 3/2013 | Slocum | ........... | H01M 4/0433 |
| | | | | 29/623.1 |
| 2014/0315080 A1* | 10/2014 | Abusleme | ........... | C08F 214/186 |
| | | | | 429/189 |
| 2014/0377663 A1* | 12/2014 | Suematsu | ........... | H01G 9/0036 |
| | | | | 429/232 |
| 2015/0108413 A1* | 4/2015 | Gutel | ........... | H01M 4/604 |
| | | | | 252/511 |

OTHER PUBLICATIONS

Cha et. al. "Preparation of binder-free thin film Li4Ti5O12 anode with an adjustable thickness through anodic TiO2 nanotubes" Current Applied Physics 13 (2013) 1788-1795 (Year: 2013).*

Zhou et al.;"Extrusion moulding of hard-metal powder using a novel binder system"; Journal of Materials Processing Technology; 2003; p. 21-24; 137; Elsevier.

Liu et al.; "Novel Technology for Plasticizing Powder Extrusion Molding of Tungsten Heavy Alloy"; Rare Metal Materials and Engineering; Aug. 2012; p. 1495-1499; vol. 41 No. 8; Web of Science.

Jardiel; "Fabrication of 8-YSZ thin-wall tubes by powder extrusion moulding for SOFC electrolytes"; Ceramics International; 2009; p. 2329-2335; 35; Elsevier.

Monzon et al.; "Design of Industrially scalable microtubular solid oxide fuel cells based on an extruded support"; International Journal of Hydrogen Energy; 2014; p. 5470-5476; 39; Elsevier.

Cha et al.; "Preparation of binder-free thin film Li4Ti5O12 anode with an adjustable thickness through anodic TiO2 nanotubes"; Current Applied Physics; 2013; p. 1788-1795; 13; Elsevier.

Takami et al.; "High-power and long-life lithium-ion batteries using lithium titanium oxide anode for automotive and stationary power applications"; Journal of Power Sources; 2013; p. 469-475; 244; Elsevier.

Yu et al.; "Model Prediction and Experiments for the Electrode Design Optimization of LiFePO4/Graphite Electrodes in High Capacity Lithium-ion Batteries"; Bull. Korean Chem. Soc.; 2013; p. 79-88; vol. 34, No. 1.

Zheng et aL; "A comprehensive understanding of electrode thickness effects on the electrochemical performances of Li-ion battery cathodes"; Electrochimica Acta; 2012; p. 258-265; 71; Elsevier.

Smekens et al.; "Influence of Electrode Density on the Performance of Li-Ion Batteries: Experimental and Simulation Results"; energies; 2016;12 pages; 9, 104; www.mdpi.com/journal.energies.

Carmen De La Torre-Gamarra, "High Mass Loading Additive-Free LiFePO4 Cathodes with 500 μm Thickness or High Areal Capacity Li-ion Batteries", Journal, 2020, 1-12, vol. 458, Journal of Power Sources.

Jitti Kasemchainan, "All-Solid-State Batteries and their Remaining Challenges", Article, 2018, 177-180, vol. 62, No. 2, Johnson Matthey Technology Review.

"Coin Cell Configurations Electrochemical Results of NMC 81", Graph, 2020, 1.

* cited by examiner

ELECTRODES FOR RECHARGEABLE LITHIUM BATTERIES

The present invention relates to an electrode made of an active ceramic material with lithium, without polymer binders and with a thickness more than 50 µm, to the method for manufacturing same, and to the use thereof in rechargeable batteries.

STATE OF THE ART

Li-ion batteries are the most advanced technology in commercial rechargeable batteries. However, the high electrical energy demands required by new applications, such as portable electronic equipment, electric cars or large storage systems required by renewable energies, make it necessary to develop new rechargeable batteries capable of storing a greater quantity of energy.

At present, the electrodes used in conventional Li-ion batteries are manufactured using calendering techniques of an active material powder paste, binders, solvents and additives, which are extended and deposited on metal sheets that act as current collectors (aluminium for the cathode and copper for the anode). The presence of these binders, solvents and additives is what in general limits the working temperature range and is also, in some cases, the cause of explosions and combustion of commercial lithium-ion batteries.

On the other hand, powder extrusion moulding is a process derived from the powder injection moulding process and it has been used to manufacture hard metal and refractory metal bars (J. C. Zhou J. C. et al., J. Mat. Proc. Techn., 2003, 137 (1-2), 21-24; Liu, W. S. et al. Rare Metals Mat. & Eng., 2012, 41(8), 1495-1499). However, it has not been used to date for manufacturing ceramic layers with applications in rechargeable lithium batteries.

Both the powder extrusion and injection moulding techniques have the capacity of producing, at comparatively low costs, complex geometry components (especially in the case of injection) and with high precision. The raw materials used usually contain 70 vol % of ceramic powders and 30% of additives such as waxes, lubricants and plasticizers, which comprise the binder system; and the process has four main stages: mixing, moulding, debinding and sintering.

The debinding process of the moulded part should be progressive from the outside to the interior of it. And, therefore, the thickness of the part hinders the additive elimination process.

The powder extrusion moulding technology is a more effective layer manufacturing method for ceramic pieces than uniaxial pressing, which has the main limitation of the thickness obtained in large parts.

Bearing this background in mind, the already known powder extrusion technology (Jardiel, T. et al. *Ceramics International*, 2009, 35(6), 2329-2335; Monzón, H. et al. *International Journal of Hydrogen Energy*, 2014, 39(10), 5470-5476) is presented in this patent as an effective method for manufacturing ceramic electrodes (anodes and cathodes) with application in rechargeable lithium batteries, making it possible to have layers formed solely by the active electrode material and, therefore, additive-free, which gives it high added value, since the electrodes of commercial rechargeable batteries are composite materials (composites) formed by the active material and a variable number of additives that improve their electrical and mechanical properties.

As these additives are electrochemically inactive materials, they involve the increase in weight of the battery without increasing the capacity or specific energy of the active material. Furthermore, their use entails a limitation as regards the battery's operating temperature range, and may give rise to safety problems when it operates at a high temperature.

Particularly, the manufacturing method opens the doors to a new rechargeable lithium battery technology, which can be called self-supported (supported anode or supported cathode) depending on what the element is (anode or cathode) that structurally supports the components of the electrochemical cell.

It also opens the door to developing new technologies called "All solid state batteries" or batteries where electrolytes are not used, which contain liquid solvents and, therefore, are capable of working at temperatures over 200° C.

DESCRIPTION OF THE INVENTION

The invention relates to an electrode with high thickness made of ceramic material with lithium, without polymer binders (additives) and their use in rechargeable batteries.

Likewise, the invention relates to the method for manufacturing same by powder extrusion moulding technology.

This method allows manufacturing electrodes (anodes or cathodes) with thicknesses of active material between 150 and 2000 micrometers, and therefore with high loading which allows increasing the energy stored in the batteries. In particular, it highlights the high value of capacity per unit of area supplied by some of the cells assembled (up to 12.7 mAh/cm$^2$). This value has been reached thanks to the high thickness of the ceramic layers and, therefore, the high loading of active material (~115 mg/cm$^2$) which is achieved using the extrusion method presented.

Another important technological advantage of the ceramic electrodes of this patent is that on eliminating the polymers used as binders in commercial batteries, it is possible to manufacture batteries capable of working at temperatures considerably higher than the current ones, not limiting the operating temperature to that of the degradation of these binders, without loss of operating performance, which translates into greater thermal stability, greater mechanical stability and improved battery safety. They can also be used with inorganic, or solid polymer electrolytes and also with liquid electrolytes with high boiling temperature or with ionic liquids.

Therefore, a first aspect of the invention relates to an electrode wherein the active electrode material is selected from a mixed oxide of lithium and a lithium phosphate, characterized in that they have a thickness in a range between 50 µm and 2000 µm, and a density in a range between 2.2 and 4.0 g/cm$^3$.

In a preferred embodiment, the mixed oxide with lithium is selected from:
a) mixed oxides of lithium and titanium of general formula $Li_xTi_yO_z$, wherein x, y, z are in a range between 0.01 and 1;
b) mixed oxides of lithium, manganese and metal elements with spinel-type structure of general formula $Li_xMn_{2-y}M_yO_{4-z}$,
   wherein x is in a range between 0.9 and 1.15;
   y is in a range between 0.01 and 1;
   z is in a range between 0.0 and 1; and
   M comprises one or more elements selected from the group consisting of nickel (Ni), chromium (Cr), cobalt (Co), titanium (Ti), iron (Fe), copper (Cu), zinc (Zn), aluminium (Al), tin (Sn), and vanadium (V);

c) mixed oxides of lithium, cobalt and metal elements with laminar structure of general formula $Li_xCo_{1-y}M_yO_2$, wherein x is in a range between 0.9 and 1.15;

y is in a range between 0 and 1; and

M comprises one element or more elements selected from the group consisting of nickel (Ni), chromium (Cr), manganese (Mn), aluminium (Al), titanium (Ti), iron (Fe), copper (Cu), zinc (Zn), tin (Sn), and vanadium (V).

In a more preferred embodiment, the mixed oxide with lithium is a mixed oxide of lithium and titanium of general formula $Li_xTi_yO_z$, wherein x, y, z are in a range between 0.01 and 1; more preferably, wherein X e Y are in a range between 0.1 and 0.8; even more preferably, the mixed oxide of lithium and titanium is $Li_4Ti_5O_{12}$.

In another embodiment, the phosphate with lithium is a phosphate of lithium, iron and metal elements with olivine structure of general formula $LiFe_{1-y}M_y(PO_4)$, wherein y is in a range between 0 and 1; and M comprises one element or more elements selected from the group consisting of nickel (Ni), chromium (Cr), manganese (Mn), cobalt (Co), aluminium (Al), titanium (Ti), iron (Fe), copper (Cu), zinc (Zn), and tin (Sn).

In another preferred embodiment, the electrode of the invention has a thickness in a range between 450 and 1000 µm.

In another preferred embodiment, the electrode of the invention has a density in a range between 2.5 and 4.0 g/cm³.

In another preferred embodiment, the electrode of the invention consists of a ceramic layer characterized in that there is no presence of binder, it has a thickness in a range between 50 µm and 2000 µm, and a density in a range between 2.2 and 4.0 g/cm³. More preferably, the ceramic layer has a thickness in a range between 450 and 1000 µm and a density in a range between 2.5 and 4.0 g/cm³.

In a second aspect, the invention relates to the use of the electrode of the invention for manufacturing a primary or secondary electrochemical cell, and more preferably a rechargeable lithium battery or a system of rechargeable lithium batteries comprising at least one electrode as previously described, an electrolyte compatible therewith, a separator situated between the anode and the cathode, and two current collectors whereon the electrodes are disposed.

"Electrolyte compatible" with the ceramic electrodes is understood to be an electrolyte which has high conductivity of Li⁺ ions, which is an electronic insulator and has high electrochemical stability. In a preferred embodiment, this electrolyte comprises a lithium salt dissolved in an organic solvent or in an ionic liquid.

In a more preferred embodiment, said organic solvent may be selected from the group comprising: propylene carbonate, ethylene carbonate, fluoroethylene carbonate, butylene carbonate, dimethyl carbonate, diethyl carbonate, ethyl methyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, 1,3-dioxolane, 4-methyl-1,3-dioxolane, N,N-dimethylformamide, dimethylacetamide, N-methylformamide, methylacetamide, N,N,N',N'-tetraethylsulfonamide, dimethylsulfoxide, dioxane, 1,2-dimethxyethane, sulfolane, fluorocarbamate, nitrobenzene, diethylene glycol-dimethyl ether, and the mixtures thereof. More preferably, the organic solvent is a mixture of ethylene carbonate and dimethyl carbonate.

In another preferred embodiment, the ionic liquid can be selected from PYR1A (N-alkyl-N-methylpyrrolidinium)-TFSI (bis(trifluoromethanesulfonyl)imide), PYR1A-FSI (bis(fluorosulfonyl)imide), and the mixture of both.

In another preferred embodiment, the lithium salt is selected from $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers), $Li(CF_3SO_2)_3C$, $Li(CN)_3C$, LiCl, LiI, and the mixtures thereof. More preferably, the lithium salt is selected from $LiPF_6$ and $Li(CF_3SO_2)_2N$.

"Separator" is understood as an electronic insulating material, with high mechanical resistance, high chemical resistance and high wettability by the liquid electrolyte. In a preferred embodiment, the separator is a fibreglass membrane or a macro or microporous polymer, generally in the form of sheet, film or similar manufactured from polymers such as polypropylene, polyethylene, fibreglass, polyester, polytetrafluoroethylene (PTFE), polyimide, polyethersulfone, or combinations thereof. The pores of these separators are filled with liquid electrolyte. The separator may also be non-porous. In this case, the separator swells in contact with the liquid electrolyte and the polymer is selected from homopolymer or copolymers of ethylene oxide (PEO), PVDF-HFP copolymers, polyacrylonitrile or poly(methacrylonitrile), and combinations thereof.

"Current collector" is understood as a material with high electronic conductivity, high mechanical resistance and high chemical resistance. In a preferred embodiment, the current collectors are one or several metal elements such as copper, aluminium, nickel in the form of sheets, meshes or foams or carbonaceous materials with high electronic conductivity.

"A system of rechargeable lithium batteries" or "stackable batteries" relates to an array of batteries that results from electrically connecting the batteries of the invention in series and/or in parallel. Said system, typically known as "stack" of batteries, must have values of voltage, intensity, energy density and/or power suitable for the application wherein they are used. These systems of rechargeable lithium batteries are especially interesting since, for example, they are those required for electric vehicles.

A third aspect of the invention relates to the method of manufacturing the electrode as previously described, comprising the following stages:

(i) mixing of the active electrode material which is selected from a mixed oxide of lithium or a lithium phosphate, in the form of powder, with a polymer binder;

(ii) granulation of the extrudable mixture obtained in stage i) to obtain the pellets that feed the extruder;

(iii) extrusion of the granulate of stage ii) to obtain an electrode of desired thickness and dimensions;

(iv) elimination of the binder; and (v) sintering at a temperature between 750 and 1250° C., in an atmosphere selected from an oxidizing (air, oxygen), inert (argon, nitrogen), and reducing (nitrogen, argon or $N_2/Ar/H_2$ mixtures in variable quantities) atmosphere.

In a preferred embodiment, the elimination of the binder takes place by means of a combined cycle comprising a first stage of solvent debinding, such as, for example, n-heptane, at 50° C. for 3 h, followed by another stage of thermal debinding, wherein the product obtained in the previous stage is subjected to 200° C. and later to 450° C. In the solvent debinding stage the extraction of the wax and stearic acid occurs, and in the second stage the polypropylene degradation fundamentally takes place.

In the present invention, "polymer binder" systems are understood as any of the polymers typically used in thermoplastic extrusion moulding mixed with waxes, such as paraffin, and other additives, such as stearic acid. These polymers can be selected from the group formed by homopolymers and copolymers of polypropylene, homopolymers and copolymers of high- and low-density polyethylene, homopolymers and copolymers of polyethylene-vinyl-acetate, polystyrene, polyvinyl chloride, polyethylene terephthalate, polyamides, poly(methyl methacrylate), polycarbonate, poly(methacrylonitrile), polyacrylonitrile, polyaniline or mixtures thereof.

In a preferred embodiment, the "polymer binder" is a mixture of polypropylene, paraffin wax and stearic acid.

In another embodiment of the invention, it is possible to add one or several carbonaceous materials in the form of powder to the polymer binder, such as, for example, carbon black, or in the form of fibres, such as carbon nanotubes, or in the form of sheets, such as graphene materials, in a sufficient quantity to achieve the percolation of the carbonaceous materials, and in consequence ensure suitable electronic conductivity in the ceramic layer. In another preferred embodiment, it is possible to add, instead of the carbonaceous material or in addition to it, metal powder, such as silver or copper.

Throughout the description and the claims, the word "comprises" and its variants are not intended to exclude other technical characteristics, additives, components or steps. For persons skilled in the art, other objects, advantages and characteristics of the invention will be inferred in part from the description and in part from the practice of the invention. The following figures and examples are provided by way of illustration, and are not intended to limit the present invention.

EXAMPLES

The invention shall be illustrated below by means of assays performed by the inventors that reveal the effectiveness of the product of the invention.

Example 1. Manufacturing of the Electrodes

Figure 1:
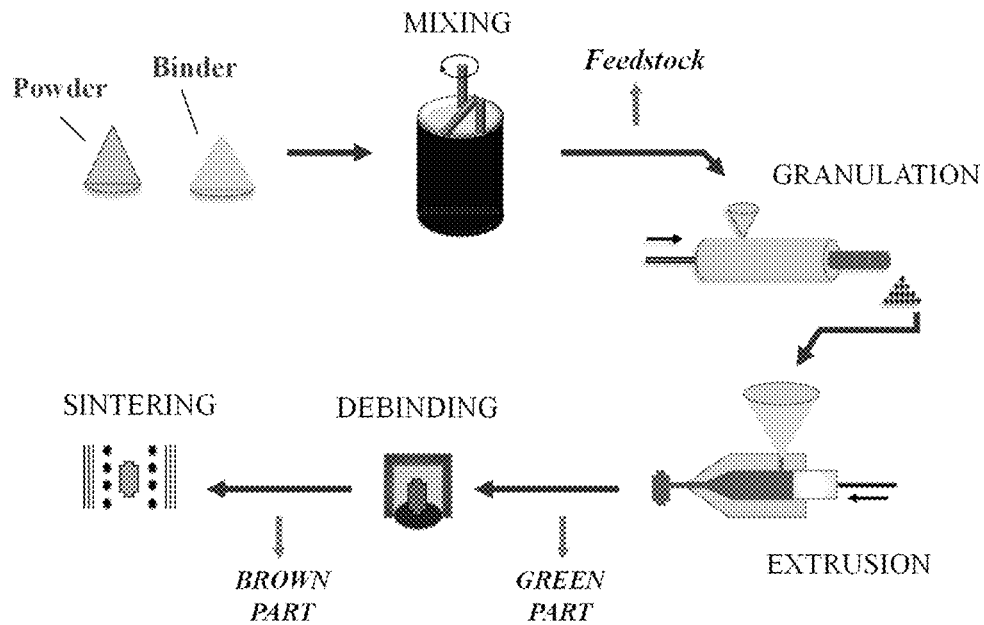
FIG. 1.—Diagram of the powder extrusion moulding process. The active material in the form of powder is initially mixed with a binder. This mixture, called "feedstock", is subjected to a pelletization process to favour its incorporation in the extruder. The extrusion is performed in a conventional plastics extruder obtaining the desired form. Subsequently, the binder is eliminated and the ceramic electrode is finally sintered in a controlled atmosphere.

In the powder extrusion moulding method that has been developed (stages of the process in FIG. 1), initially, 95 g of $Li_4Ti_5O_{12}$ powder are mixed with a polymer binder (binder) (10 g of polypropylene, 9 g of paraffin wax and 1 g of stearic acid) at 170° C. and 40 r.p.m. This mixture, called "feedstock", is subjected to a pelletization process to favour its incorporation in the extruder. The extrusion is performed in a conventional plastics extruder obtaining the desired form of layer with a thickness close to 1 mm. Subsequently, the binder is eliminated in two stages. Initially, the layers are submerged in n-heptane at 50° C. for 3 h, and they are subsequently subjected to a thermal cycle until 450° C. to completely eliminate the binder. Finally, the ceramic electrode is sintered in an Ar-5% $H_2$ atmosphere at 1000° C. for 1 h.

Example 2. Electrochemical Studies of the Electrodes

The ceramic electrodes that have been manufactured in Example 1 have been tested in hermetic coin cells-type format. These cells are formed by: 1) a copper current collector in direct contact with the self-supporting $Li_4Ti_5O_{12}$ electrode, 2) a 1M solution of the $LiPF_6$ lithium salt dissolved in a 1:1 mixture by weight of ethylene carbonate and dimethyl carbonate, which is embedded in a fibreglass separator, and 3) a lithium metal sheet as negative electrode.

To demonstrate the technological advantages of the spinel $Li_4Ti_5O_{12}$ ceramic electrodes object of the present patent, control electrodes have been manufactured using powder of the same commercial sample of $Li_4Ti_5O_{12}$ as active electrode material. These electrodes have been prepared in the same way as the commercial electrodes for rechargeable Li-ion batteries are prepared.

The formulation of the control electrodes manufactured has been 80 weight % of $Li_4Ti_5O_{12}$, 10% of carbon black and 10% of the polyvinylidene fluoride polymer (PVDF). All these components of the composite material electrode have been deposited on copper or aluminium sheets. The one manufactured with the greatest thickness (122 μm), and which did not have any fractures on its entire surface area, has been used as control electrode.

Figure 2:
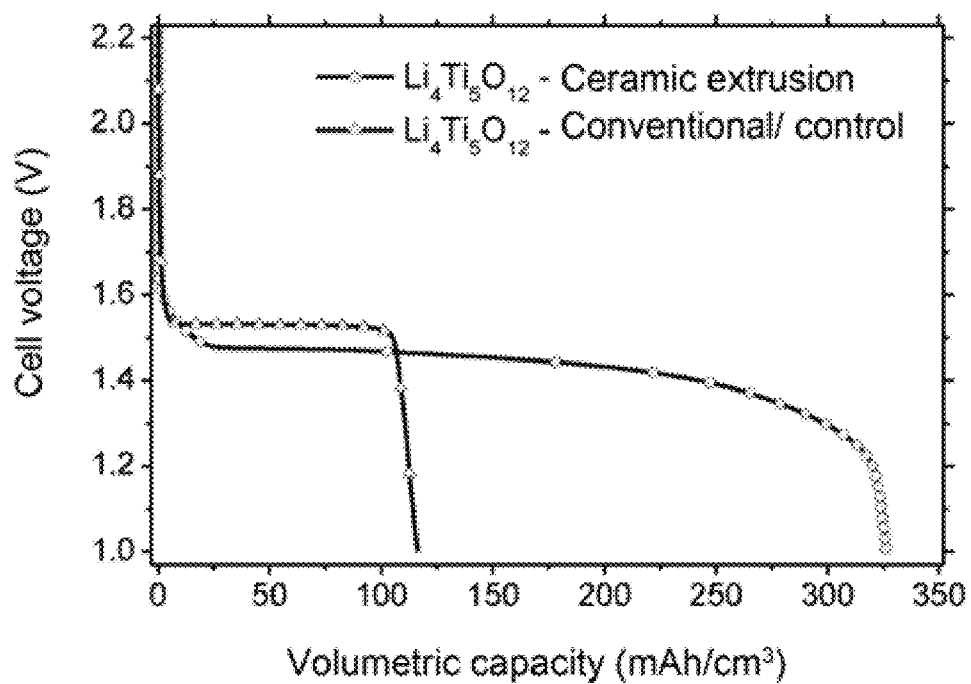
FIG. 2.—Comparison of the discharge curve of a $Li_4Ti_5O_{12}$ ceramic electrode (without polymer binders) manufactured by the extrusion method of this patent at 1000° C. (475 μm, 141 mg/cm$^2$) and a control electrode (with polymer binders and carbon black) with high thickness (122 μm, 16 mg/cm$^2$) processed by the conventional method of "tape casting" on a copper current collector. The experiment was carried out at a constant current intensity of 7.3 mA/g (C/24) and 30° C.

FIG. 2 represents the discharge curves of a $Li_4Ti_5O_{12}$ ceramic electrode of 470 μm thickness and 141 mg/cm$^2$ weight and the control electrode (122 μm thickness and 16 mg/cm$^2$ of $Li_4Ti_5O_{12}$) recorded for a constant current of 7.3 mA/g (C/24). The comparative study of the curves obtained demonstrates that the electrode manufactured in the patent is capable of storing almost three times the electricity per unit of volume (326 mAh/cm$^3$) as that of the control electrode (116 mAh/cm$^3$). The improvement is even greater when the capacity per surface area is compared. Thus, the electrode manufactured using the extrusion method that we have developed for this patent has a capacity of 12.7 mAh/cm$^2$, while for the control electrode is 1.4 mAh/cm$^2$. Therefore, the increase is by a factor of ~10 times for this electrochemical parameter. The working voltage of the ceramic electrode object of this patent and that of the control electrode are close together, having a value of ~1.5V. In both cases, the voltage remains practically invariable during the electrode operation (FIG. 2). An important technological aspect is that these voltage values prevent the formation of the hazardous lithium dendrites which occurs in commercial batteries with graphite anodes, considerably increasing battery safety.

Figure 3:
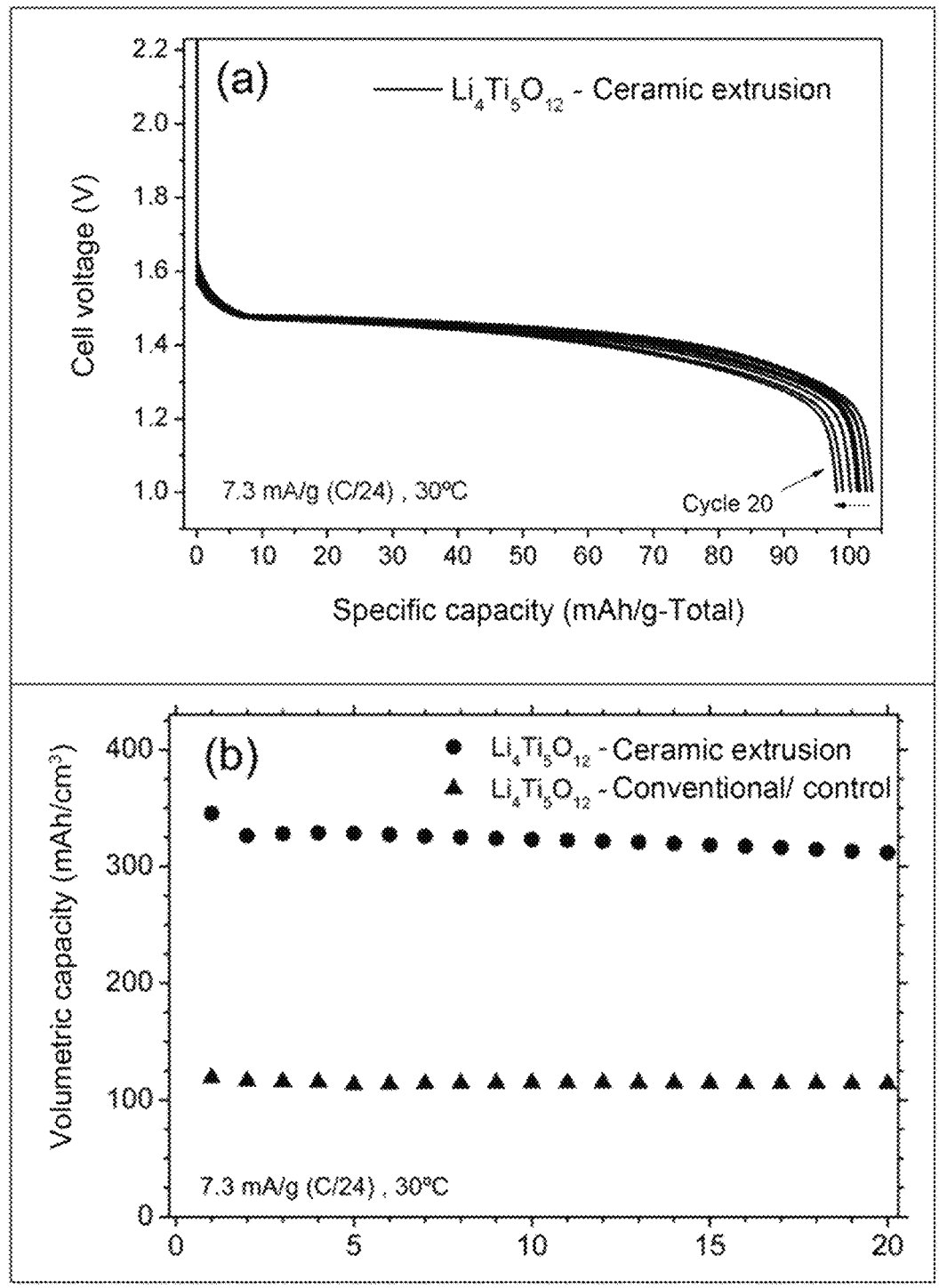
FIG. 3.—(a) Selection of discharge curves recorded during the cycling of the $Li_4Ti_5O_{12}$ ceramic electrode manufactured using extrusion and subsequently sintered at 1000° C. using a constant current intensity of 7.3 mA/g in charge and discharge. (b) Comparison of the volumetric variation of the $Li_4Ti_5O_{12}$ ceramic electrode manufactured by extrusion and the control electrode for the cycling study at 30° C. between 2.7 and 1V.

The electrochemical behaviour of the $Li_4Ti_5O_{12}$ ceramic electrodes has also been studied for successive charge/discharge cycles. FIG. 3.a represents a selection of discharge curves recorded for the cycling of a ceramic electrode manufactured according to Example 1 and with a spinel charge of 141 mg/cm$^2$. The successive charge/discharge cycles shall be carried out at a constant intensity of 7.3 mA/g (C/24), 30° C. and in the voltage range from 2.7 V to 1 V.

As observed in FIG. 3.a, the curves for the different cycles are analogous, solely observing a small increase in the specific capacity when the number of completed cycles is increased. This result demonstrates that the $Li_4Ti_5O_{12}$ ceramic electrodes object of the present patent cycle in an efficient way. In FIG. 3.b, the cycling behaviour of the ceramic electrode is compared with the composite material control electrode. After 25 discharge/charge cycles, the ceramic electrode is capable of supplying 312 mAh/cm$^3$; i.e. the electrode has retained 95.7% of its nominal capacity (326 mAh/cm$^3$) after the cycling study. This result is very important as it demonstrates that the $Li_4Ti_5O_{12}$ ceramic electrode maintains its electrochemical activity during cycling.

When it is compared with the control electrode, it is clearly observed how the reversible capacity of the ceramic electrode (~320 mAh/cm$^3$) is much greater than the control electrode (~115 mAh/cm$^3$). In conclusion, the electrochemical studies performed enable demonstrating that the spinel $Li_4Ti_5O_{12}$ ceramic electrode manufactured by the extrusion method can be used as anode in high-energy rechargeable lithium batteries and with improved safety. The specific electrochemical features of this electrode are clearly superior to the control electrode manufactured by the conventional method and using the same commercial sample of $Li_4Ti_5O_{12}$ as active material.

The invention claimed is:

1. A manufacturing method of an electrode for batteries, wherein an active electrode material is selected from a mixed oxide of lithium or a lithium phosphate, characterized in that the electrode has a thickness in a range between 50 μm and 2000 μm, and a density in a range between 2.2 g/cm3 and 3.6 g/cm3, and the active electrode material is without polymer binders, and wherein the active electrode is selected from:
   a) mixed oxides of lithium and titanium of general formula LixTiyOz, wherein x, y, z are in a range between 0.01 and 1;
   b) mixed oxides of lithium, cobalt and metal elements with laminar structure of general formula LixCo1-yMyO2,
   wherein x is in a range between 0.9 and 1.15;
   y is in a range between 0 and 1; and
   M comprises one or more elements selected from the group consisting of nickel (Ni), chromium (Cr), manganese (Mn), aluminium (Al), titanium (Ti), iron (Fe), copper (Cu), zinc (Zn), tin (Sn), and vanadium (V);
   c) phosphate of lithium, iron and metal elements with olivine structure of general formula LiFe1-yMy(PO4), wherein y is in a range between 0 and 1; and
   M comprises one or more elements selected from the group consisting of nickel (Ni), chromium (Cr), manganese (Mn), cobalt (Co), aluminium (Al), titanium (Ti), iron (Fe), copper (Cu), zinc (Zn), and tin (Sn),
   comprising the following stages:
   (i) mixing of the active electrode material which is selected from the mixed oxide of lithium or a lithium phosphate, in the form of powder, with a polymer binder;
   (ii) granulating of an extrudable mixture obtained in stage i) to obtain the pellets that feed an extruder;
   (iii) extruding of the granulate of stage ii) to obtain an electrode of desired thickness and dimensions;
   (iv) eliminating the binder by a combined cycle comprising a first stage of elimination with solvent followed by a stage of thermal elimination; and
   (v) sintering at a temperature between 750 and 1250° C. in an atmosphere selected from oxygen, air, argon, nitrogen, argon-nitrogen mixtures, and nitrogen-hydrogen mixtures.

2. The method according to claim 1, wherein the active powder of stage i) is a mixed oxide of lithium and titanium.

3. The method according to claim 2, wherein the active powder of stage i) is Li4Ti5O12.

4. The method according to claim 1, wherein the polymer binder of stage i) is a thermoplastic material selected from homopolymers and copolymers of polypropylene, homopolymers and copolymers of high- and low-density polyethylene, homopolymers and copolymers of polyethylene-vinyl-acetate, polystyrene, polyvinyl chloride, polyethylene terephthalate, polyamides, poly (methyl methacrylate), polycarbonate, polyacrylonitrile, polyaniline or mixtures thereof.

5. The method according to claim 4, wherein the polymer binder is a mixture of polypropylene, paraffin wax and stearic acid.

6. The method according to claim 4, wherein one or several carbonaceous materials in the form of powder, fibers or sheets are added to the binder.

7. The method according to claim 6, wherein the carbonaceous material is carbon black.

8. The method according to claim 1, wherein the debinding stage (iv) takes place by means of a combined cycle comprising a first stage of elimination with solvent at 50° C. for 3 h, followed by a stage of thermal elimination, wherein the product obtained from the previous stage is subjected to 200° C. and later to 450° C.

* * * * *